United States Patent [19]

Hull et al.

[11] E Patent Number: Re. 32,825

[45] Reissued Date of Patent: Jan. 10, 1989

[54] PROCESS FOR THE ELECTROCHEMICAL REDUCTIVE BLEACHING OF LIGNOCELLULOSIC PULP

[75] Inventors: Michael N. Hull, Bardonia; Vacheslav M. Yasnovsky, Orangeburg, both of N.Y.

[73] Assignee: International Paper Company, Tuxedo Park, N.Y.

[21] Appl. No.: 63,466

[22] Filed: Jun. 17, 1987

Related U.S. Patent Documents

Reissue of:

[64] Patent No.: 4,596,630
Issued: Jun. 24, 1986
Appl. No.: 684,993
Filed: Dec. 21, 1984

[51] Int. Cl.[4] ..... D21C 9/10

[52] U.S. Cl. ..... 162/50; 162/72; 162/79

[58] Field of Search ..... 162/50, 72, 79, 71; 204/133; 8/107; 252/181.1

[56] References Cited

U.S. PATENT DOCUMENTS

| | | | |
|---|---|---|---|
| 1,717,799 | 6/1929 | Marr | 162/163 |
| 1,840,413 | 1/1932 | Schmidt | 162/79 |
| 2,119,519 | 6/1938 | Bragg | 162/79 |
| 2,249,646 | 7/1941 | Bragg | 8/105 |
| 2,549,099 | 4/1951 | Kaswell | 204/133 |
| 2,975,169 | 3/1961 | Crawford et al. | 260/212 |
| 3,156,654 | 11/1964 | Konceny et al. | 252/95 |
| 3,453,213 | 7/1969 | Wade | 252/105 |
| 4,016,029 | 4/1977 | Samuelson | 162/131 |

OTHER PUBLICATIONS

02440, Chelating Agents & Metal Chelates; Academic Press New York and London 1964.

Characterization of Chromophoric Groups in Groundwood and Lignin Model Compounds by Reaction with Specific Reducing Agents; Technical Paper T154; R. A. Fleury, and W. H. Rapson, University of Toronto, Toronto, Ont.

*Primary Examiner*—Steve Alvo

*Attorney, Agent, or Firm*—Luedeka, Hodges & Neely

[57] ABSTRACT

Reductive bleaching of lignin containing pulps employing polydentate ligand complexes of dipositive vanadium, chromium and titanium. High brightness pulps with good reversion stability are obtained. The process is essentially polution free as the reduced complexes can be repeatedly regenerated electrochemically.

11 Claims, 5 Drawing Sheets

106a, 116a
127
126
125
105
106b, 116a
124
106a, 116a
128
110
108
101
118
102
103
111
106
116a
109
104
102
106b
121
122
106b
123
116a
113
115
113
115
CURRENT SOURCE 114
+
-

PROCESS FOR THE ELECTROCHEMICAL REDUCTIVE BLEACHING OF LIGNOCELLULOSIC PULP

Matter enclosed in heavy brackets [ ] appears in the original patent but forms no part of this reissue specification; matter printed in italics indicates the additions made by reissue.

BACKGROUND OF THE INVENTION

This invention relates to compositions of matter comprising polydentate ligand complexes of chromium, vanadium and titanium having an electrochemically generated 2+ formal valence charge on the metal atom in the complex, processes for their formation, processes for their use as reducing agents in bleaching or brightening lignocellulosic pulps, principally wood pulp, either as mechanical wood pulp, or chemical wood pulp and to the brightened pulps produced thereby.

Reductive bleaching or brightening of lignocellulosic pulps particularly mechanical wood pulps has long been practiced. The principal reagent for this purpose has been hydrosulfite (dithionite) ion ($S_2O_4^{=}$) exployed principally as its zinc or sodium salts in aqueous solution. More recently sodium borohydride ($NaBH_4$) in various formulations has also been employed as a replacement for hydrosulfite.

The problems and limitations involved in the use of both reagents, such as, lack of stability in solution or in the presence of oxygen, the inability to reuse spent reagent requiring its environmentally acceptable disposal and the limited ability of either reagent to produce high brightness pulp are well known to those skilled in the art.

Applicants have discovered a new series of reducing agents which are capable of eliminating or minimizing most of the deficiencies of borohydride and hydrosulfite in reductive bleaching of lignocellulosic pulp.

The use of reducing agents generated electrochemically, particularly of reducing agents generated electrochemically in situ in the process, to reductively bleach lignocellulosic pulp does not appear to have been suggested in the prior art.

Discussion of Relevant Art

Fleury and Rapson in their Article "Characterization of Chromophoric Groups in Groundwood and Lignin Model Compounds by Reaction with Specific Reducing Agents", Technical Paper T154, Pulp and Paper Magazine of Canada, Mar. 15, 1968, pp. 62 to 68 described experiments intended to assist in characterizing the fundamental structure of lignin. As part of this study uranium III and chromium II in acidic aqueous solution were employed to reduce model lignin chromophores and groundwood lignin. Dithionite and borohydride were also compared and among the results noted was that the aquo-uranium III cation was a powerful reducing agent and reduced groundwood to a higher brightness level than dithionite. It was also noted in the article that because of the heterogenous nature of the groundwood lignin reduction and the fact that the reduction took place outside the aqueous solution, the reduction potential in water would not be a good predictor of activity in brightening lignin in wood and results from one successful reductant could not be applied universally. Fleury and Rapson also worked at commercially undesirable low pH values where the aquo-uranium III ion's existence is possible. Such low pH values in commercial practice would be expected to adversely affect pulp properties.

In "Chelating Agents and Metal Chelates", Dwyer and Mellor, Ed., Academic Press, N.Y. and London (1964) pp. 264 to 267 and 305 to 309 the properties of chromium and vandium chelates are discussed. That chromium II and vanadium II are strongly reducing in aqueous solution when complexed with certain organic ligands is disclosed. Suggestion for use other than as general strong reductants in aqueous solution (if the $Cr^{II}$-EDTA complex were capable of existence) are not suggested.

Neither reference contains anything which would lead one of skill in the art to combine their disclosures so as to be able to predict with any degree of certainty that certain organic ligand complexes of vanadium II, of chromium II, or of titanium II which is not even discussed, would be capable of acting as bleaching reductants for lignin in wood.

Certainly neither reference suggests that these reducing complexes can be continuously regenerated electrochemically and repeatedly recycled to provide an economical, pollution free reductive bleach.

SUMMARY OF THE INVENTION

The invention provides a process comprising treating lignocellulosic pulp in aqueous solution and in a substantially non-oxidizing environment with a polydentate ligand complex of $Cr^{++}$, $V^{++}$ or $Ti^{++}$ formed by electrochemical reduction of the complexed metal ion.

The tangible embodiments produced by the process aspect of the invention are lignocellulosic pulps of enhanced brightness which are formable or otherwise convertible by standard methods into conventional paper products.

Special mention is made of aspects of the invention wherein the lignocellulosic pulp is mechanical wood pulp, of aspects of the invention wherein the lignocellulosic pulp is chemical wood pulp, of aspects of the invention wherein the polydentate ligand is an aminopolycarboxylic acid such as ethylene diamine tetraacetic acid, 1, 2-diaminocyclohexanetetraacetic acid, or diethylenetriaminopentaacetic acid, of aspects of the invention wherein the polydentate ligand is 8-hydroxyquinoline, or a substituted 8-hydroxyquinoline such as, 8-hydroxyquinoline-5-sulfonic acid. Special mention is also made of aspects of the invention wherein the polydendate ligand complex is recycled through the use of electrochemical reduction to regenerate the reduced form of the complex.

DESCRIPTION OF THE PREFERRED EMBODIMENT

Figure 1:
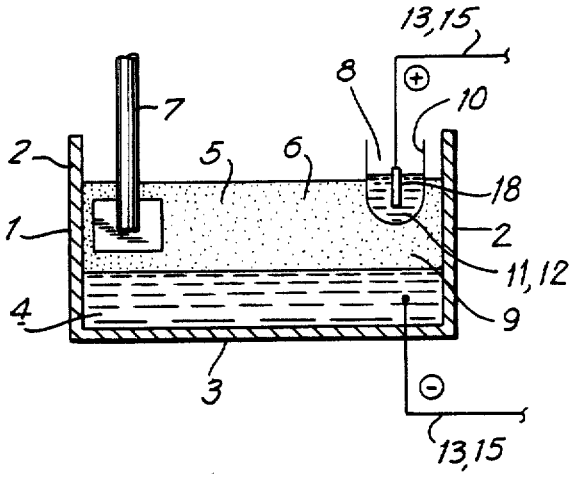
FIG. 1 is a schematic cross sectional view of an electrochemical cell suitable for practicing the invention.

Referring now to the drawings, the manner of practicing the process of the invention to produce the brightened lignocellulosic pulps thereof will now be described with reference to a specific embodiment thereof, namely bleaching of ground wood pulp by treating such pulp with an ethylenediamine-tetraacetic acid complex of divalent chromium.

Turning now to FIG. 1, electrochemical cell 1 having walls 2, and bottom 3 is shown in cross section. Contained in electrochemical cell 1 are cathode 4, conveniently a mercury pool cathode, ground wood pulp 5 in suspension in an aqueous solution of an ethylenediamine-tetraacetic acid (EDTA) complex of chromium 6. The pulp 5 is maintained in suspension and the EDTA-chromium solution is stirred conveniently by agitator or stirrer 7. In cell 1, anode compartment 8 surrounding anode 18 is separated from cathode compartment 9 containing cathode 4 by semipermeable membrane 10 and contains an electrolyte solution 11 comprising an aqueous solution of the proton acid 12 of the anion present to balance the positive charge on the chromium EDTA complex. Electrical current 13 to cell 1 is supplied from a current source 14, not shown, through conductors 15 contacting cathode 4 and electrolyte solution 11 through anode 18. It is convenient to exclude air and oxygen from the cathode compartment 9 of cell 1 and the solutions and suspension contained therein by the use of standard techniques, such as, blanketing with an inert gas 16, e.g., nitrogen 16a.

Figure 2:
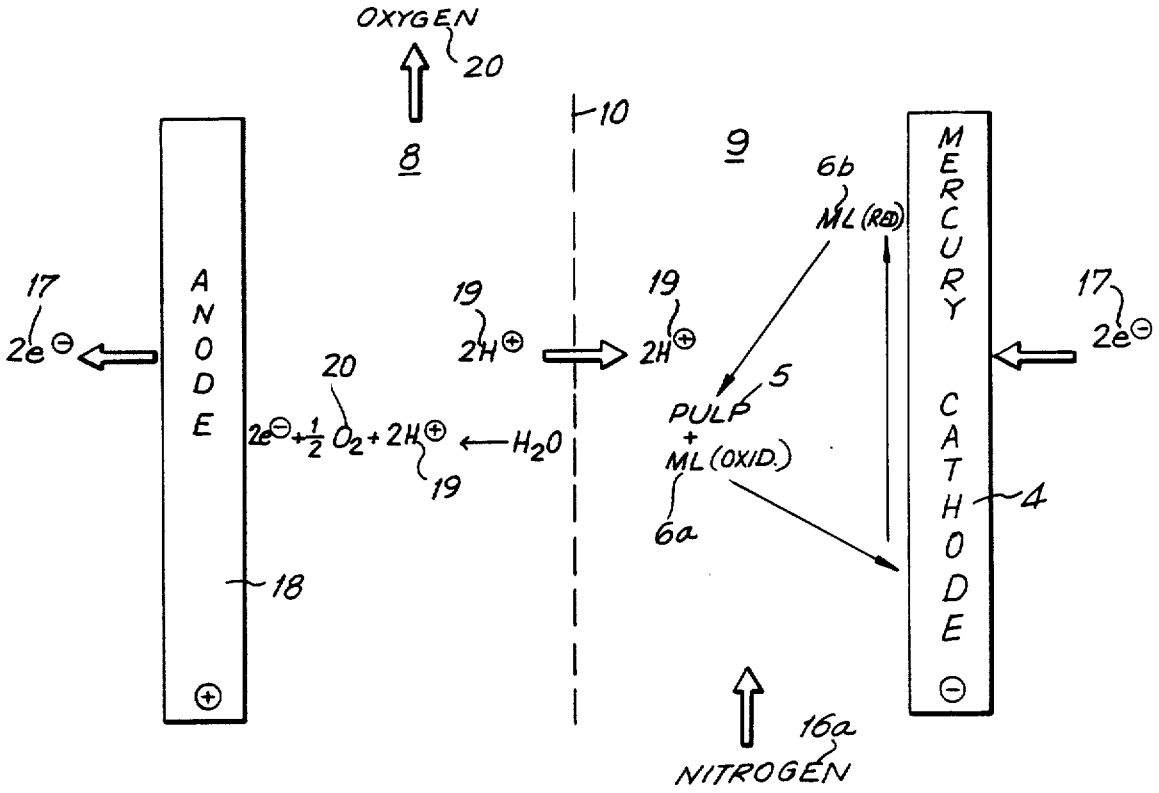
FIG. 2 is a schematic representation of an electrochemical cell illustrating the principal cell reactions thought to occur during the practice of the invention.

Turning now to FIG. 2 which illustrates schematically the process occurring when the invention is practiced in a cell analogous to the design of cell 1, current 13 supplies electrons 17 to cathode 4 which contacts aqueous solution of EDTA chromium complex 6 represented by the symbol ML having suspended therein pulp 5. As may be seen, oxidized EDTA-chromium complex 6a, that is EDTA-chromium +3, contacts cathode 4 where it is reduced to reduced EDTA-chromium complex 6b, that is EDTA-chromium +2 which contacts pulp 5 reductively reducing its color and itself being reoxidized to 6a.

In anode compartment 8, separated from cathode compartment 9 by semipermeable membrane 10, water is electolyzed at anode 18 liberating electrons 17 carried away from anode 18 as current 13. Also produced at anode 18 are protons 19 and oxygen 20 which may conveniently be vented to the atmosphere. The cell current is carried by migration of protons 19 through semipermeable membrane 10 from anode compartment 8 to cathode compartment 9.

Figure 3:
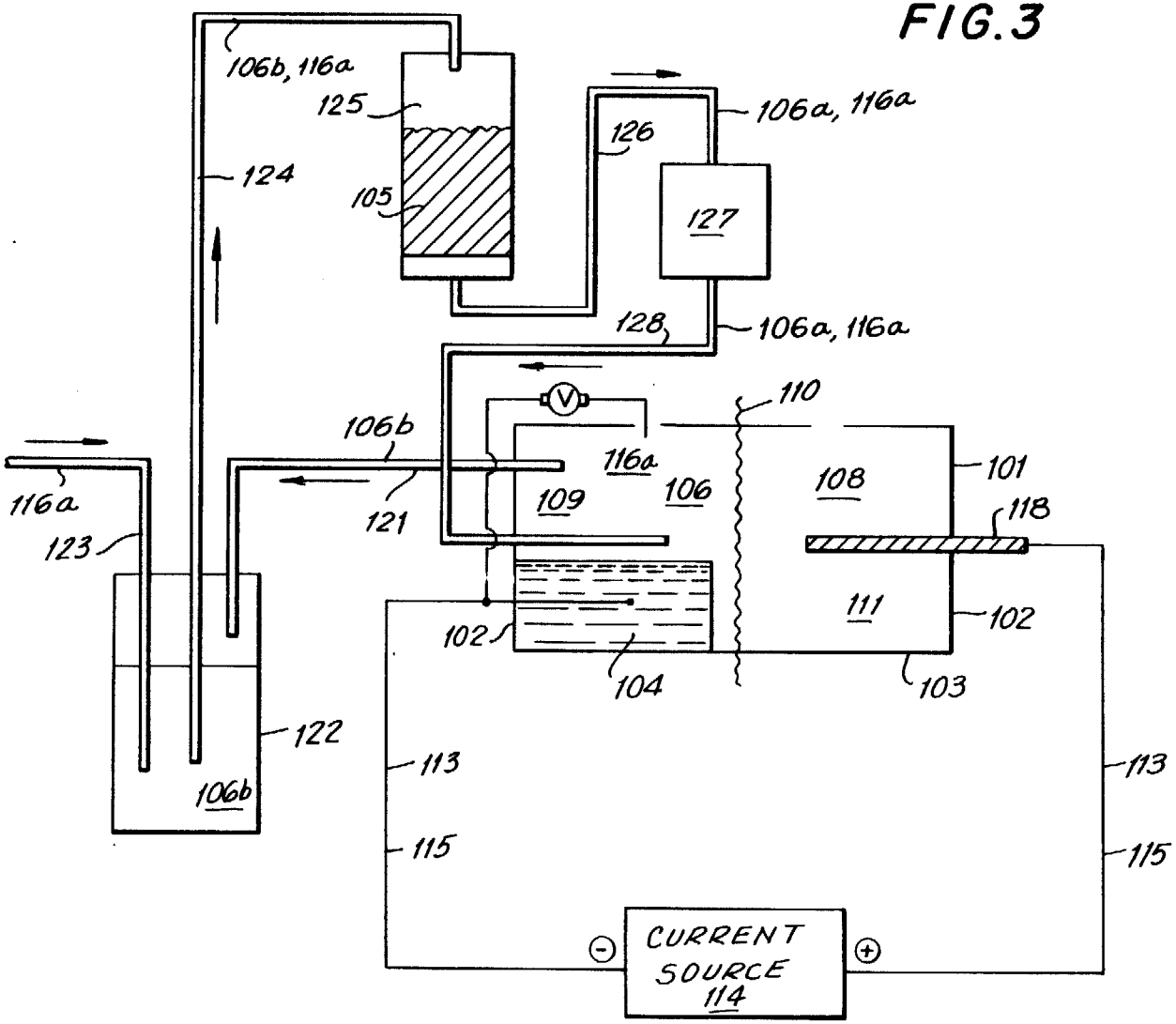
FIG. 3 is a schematic diagram of an alternative apparatus suitable for the practice of the invention.

While the apparatus and process illustrated by and described in connection with FIGS. 1 and 2 typify apparatus and processes wherein pulp 5 is bleached by contact with the reduced EDTA-chromium complex 6b in the cathode compartment 9 of cell 1 wherein the EDTA complex 6b is formed, one of skill in the art will recognize that it is also possible to treat pulp 5 with reduced EDTA-chromium complex 6b in a vessel separate from the cathode compartment 9. FIG. 3 is a schematic illustration of an apparatus for doing so.

Referring now to FIG. 3, cell 101, having walls 102 and bottom 103 includes mercury cathode 104 contacting an aqueous solution of an EDTA complex of chromium 106 retained in cathode compartment 109 separated from anode compartment 108 by semipermeable membrane 110. Anode compartment 108 contains electrolyte solution 111, again an aqueous solution of the proton acid 112 of the anion present to balance the positive charge on the EDTA chromium complex 106 in cathode compartment 109. Electrical current 113 is provided to cell 101 by current source 114 and is carried by conductors 115 contacting cathode 104 and anode 118 which in turn contacts electrolyte 111.

The cell reactions in cathode compartment 109 and anode compartment 108 are analogous to those described in connection with and with reference to FIG. 2. As a result of the cell reactions, oxidized EDTA-chromium 106a is converted by contact with cathode 104 to reduced EDTA-chromium 106b in cathode compartment 109 and oxygen 120 is liberated at anode 118 in anode compartment 108.

To bleach pulp 105, the aqueous solution of 106b, reduced EDTA-chromium complex, is transferred through conduit 121 to vessel 122 where sufficient nitrogen gas 116a is introduced through conduit 123 to provide a nitrogen over pressure and exclude air and oxygen throughout the system through which the aqueous solution containing EDTA chromium complex 106 circulates. The solution now containing nitrogen 116a and reduced EDTA-chromium complex 106b is transferred to tower 125 containing ground wood pulp 105. The solution of 106b contacts pulp 105 while passing through the mass of said pulp, reductively bleaching it while at least a portion of 106b is oxidizxed to EDTA-chromium +3 complex 106a.

The spent solution containing 106a is exhausted from tower 125 and passes through conduit 126 to pump 127, passes through pump 127 and is returned through conduit 128 to cathode compartment 109 where 106a is again reduced to 106b for recycle through the process. Pump 127 supplies the hydrostatic pressure necessary for the circulation of the solution containing the EDTA-chromium complexes 106.

One of skill in the art will recognize that in addition to the ground wood pulp illustrated above, any mechanical or chemical pulp containing chromophores substantially due to the presence of lignin which are convertible to a colorless or a less intensely colored state by reduction may be reductively bleached by the process of the invention. Illustrative of such pulps are refiner mechanical pulp, thermo-mechanical pulp, Asplund pulp, and "unbleached" or chemical pulps partially "bleached" by delignifying "bleaching". In addition, to the wood pulp specifically illustrated hereinabove, one of skill in the art will recognize that other traditional vegetable fibers prepared by the above pulping methods will be suitable for use in the invention. Illustrative of these are fibers from bamboo, bagasse, straw, flax, kenaf, hemp, jute and the like.

One of the skill in the art will also recognize that in addition to the ethylenediamine-tetraacetic acid illustrated above as a polydentate ligand forming the chromium complex exployed as the active reagent in the process of the invention, other polydentate ligands inert under the conditions of the process of the invention may be employed. Such equivalent ligands will be readily apparent to one of skill in the art. Illustrative of such other equivalent ligands are: aminopolycarboxylic acids such as, 1,2-diaminocyclohexane-tetraacetic acid, and diethylenetriaminopentaacetic acid; 8-hydroxyquinoline or substituted 8-hydroxyquinolines such as, 8-hydroxyquinoline-5-sulfonic acid.

In addition to the dipositive chromium complexed with polydentate ligands illustrated above, the invention contemplates as full equivalents polydentate ligand complexes of dipositive vanadium and of dipositive titanium, prepared and used in analogous fashion to the preparation and use of dipositive chromium complexes.

To Prepare the EDTA-chromium complex or the other metal-liquid complexes contemplated as equivalent by the invention to an appropriate concentration of a desired chromium, vanadium, or titanium salt in water may be added a desired molar equivalent of ethylene diamine tetraacetic acid or a salt thereof or a water soluble form of any of the other polydentate complexing agents contemplated as equivalent by the invention at an elevated temperature and with agitation until conductivity measurements indicate that complexation is complete.

The concentration of the polydentate ligand complex of chromium, vanadium or titanium may vary within wide limits. The concentration may range from minimal to the upper limit of solubility of the complex, preferably from about 0.1 millimole (mM) per liter to about 100 mM per liter, most preferably from about 2.0 mM per liter to about 5.0 mM per liter.

The water soluble salt of chromium, vanadium or titanium employed may be a salt of any convenient anion. For use in a typical paper mill sulfate salts will be preferred for obvious reasons.

The pH range for the practice of the invention may vary widely, preferably within the range of about 2.0 to about 9.0 pH most preferably from about 3.0 to about 4.0 pH.

The temperature and pressure for the practice of the invention may also vary with wide limits. The temperature may range from about room temperature up to 180° C., temperatures from about about 25° C. to about 90° C. when operating at normal atmospheric pressure are preferred. Pressures from about normal atmospheric pressure up to about 200 psi (pounds per square inch) over pressure may be employed.

In addition to the mercury pool cathode illustrated, the invention contemplates other known high hydrogen overvoltage cathodes as full equivalents. Illustrative of these are cathodes fabricated from materials such as, lead, metal amalgams, cadmium, graphite, and zinc. In addition low hydrogen over voltage cathodes such as iron may be employed if suitable conventional hydrogen suppressing additives are added to the cell solution.

Typical of such additives are quaternary ammonium salts.

The semi permeable membranes employed to separate the anode and cathode compartments may be any inert semi permeable membrane known in the art. Membranes sold under the Dupont Co tradename Nafion are suitable. The membrane serves to prevent oxygen from reaching and reacting with the reduced complex in the cathode compartment, thereby reducing the efficiency of the desired bleaching reaction. In addition, the membrane serves to prevent the reduced complex from being reoxidized by contact with the anode.

The positive electrode (anode) may preferably be nickel or stainless steel when the pH of the system is alkaline and lead is preferred when the pH of the system is acidic, particularly when the anion employed is sulfate.

One of skill in the art will also recognize that the oxidizing capability of the anode may be employed to produce other oxidants besides oxygen in the anode compartment. Illustrative are such oxidants as perborate, persulfate and perchlorate.

The following examples further illustrate the best mode contemplated by the inventors for the practice of their invention.

EXAMPLE 1

Southern pine groundwood, initial GE brightness 60.8, is stirred at 0.75 consistency in a $Na_2SO_4$-$H_2SO_4$ electrolyte solution at pH 4 containing 5.0 millimole (mM) per liter chromium II—EDTA complex for 3 hours at 85° C. The cathode is a mercury pool cathode maintained at about −1.30 volts versus a saturated calomel electrode. The suspension is then cooled, filtered and the pulp collected on the filter thoroughly washed to remove all traces of the chromium complex. A sheet formed from the pulp and dried by standard techniques had a GE brightness of 81.9% reverting to 70.2% after exposure to steam in the presence of air at 100° C. for one hour followed by drying of the sample at room temperature (23° C.) and then measuring the brightness (reverted brightness).

EXAMPLE 2

Following a proceedure analogous to that described in Example 1 for the reductive bleaching of southern pine groundwood with EDTA-chromium II complex, recycled newsprint, northern pine groundwood (NPGW) and southern pine groundwood (SPGW) are reductively bleached by the catalysts listed in Table 1 at the catalyst concentration, temperature of treatment, and for the times shown in the Table. The initial, final and reverted brightness determined as in Example 1 are also tabulated.

TABLE 1

| Pulp type | Reductive Bleaching Agent | Bl. Agent Conc. (m.M/l.) | Duration (hours) | Temp (°C.) | Initial Bright-ness (% GE) | Final Bright-ness (% GE) | Reverted Bright-ness (% GE) |
|---|---|---|---|---|---|---|---|
| NPGW | sodium hydro-sulfite | 3.2 | 5 | 60 | 64.9 | 75.5 | — |
| NPGW | V:EDTA (1:2) | 2.0 | 5 | 60 | 64.9 | 81.4 | 74.4 |
| SPGW | V:DACTA (1:1) | 5.0 | 24 | 25 | 60.8 | 74.9 | — |
| SPGW | V:OXINE | 5.0 | 17 | 25 | 60.8 | 71.6 | 64.0 |

TABLE 1-continued

| Pulp type | Reductive Bleaching Agent | Bl. Agent Conc. (m.M/l.) | Duration (hours) | Temp (°C.) | Initial Bright-ness (% GE) | Final Bright-ness (% GE) | Reverted Bright-ness (% GE) |
|---|---|---|---|---|---|---|---|
| | (1:3) | | | | | | |
| SPGW | V:DACTA (1:1) | 5.0 | 2 | 86 | 60.8 | 66.7 | |
| Recycled Newsprint | Cr:DTPA (1:1) | 5.0 | 3 | 85 | 56.0 | 72.3 | 65.9 |

Notes:
1 Newsprint was deinked by standard methods employed in the industry
2 DACTA is 1,2-diaminocyclohexanetetraacetic acid
3 OXINE is 8-hydroxyquinoline-5-sulfonic acid
4 DTPA is Diethylenetriaminopentaacetic acid

EXAMPLE 3

Figure 4:
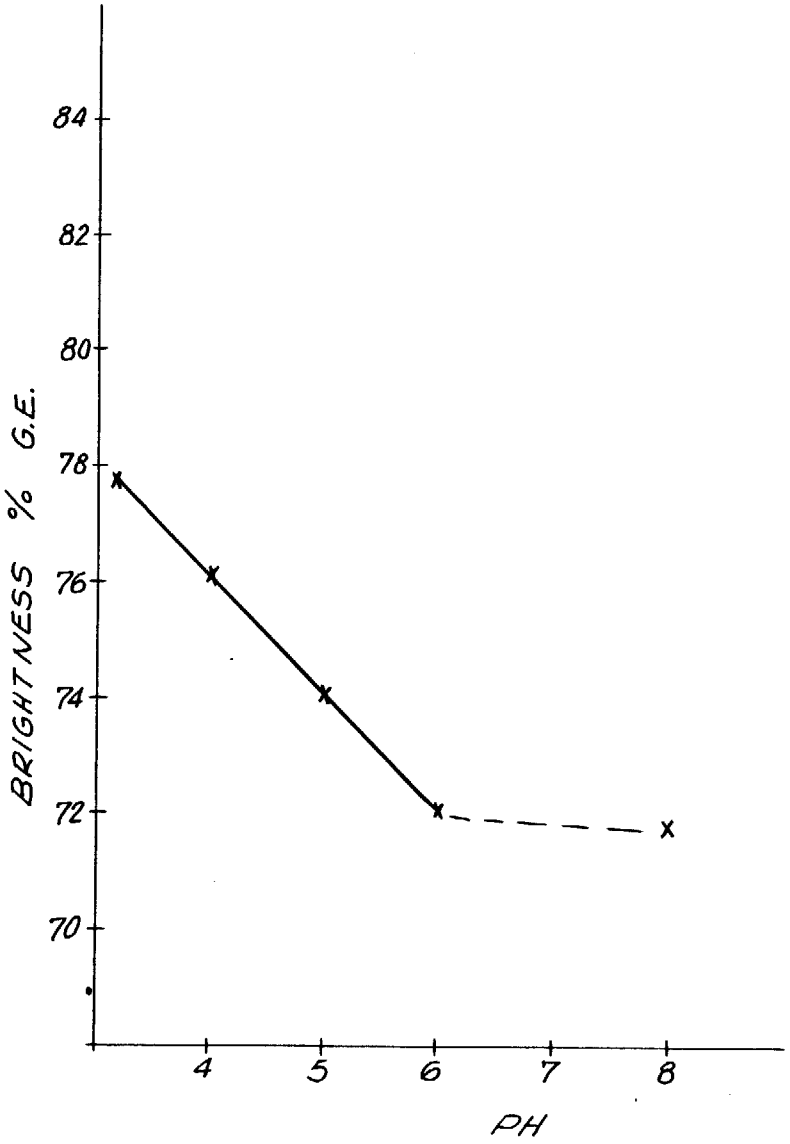
FIG. 4 is an illustration of the effect of reaction pH on the final brightness of pulp treated in the process of the invention.

Employing conditions analogous to those of Example 1, samples of northern pine groundwood, initial brightness 64.2% GE, are treated at varying electrolyte pH values at 52° C. for three hours with chromium II—EDTA complex. The final brightness values obtained are shown in FIG. 4.

EXAMPLE 4

Figure 5:
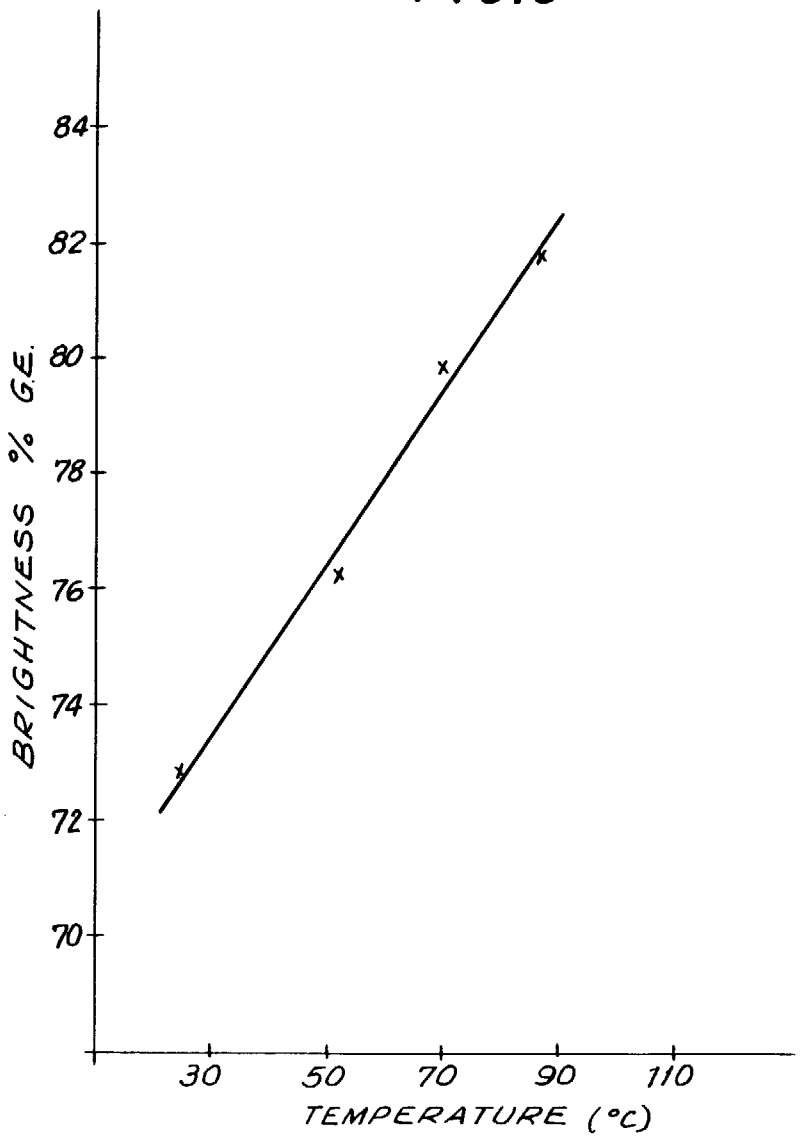
FIG. 5 is an illustration of the effect of reaction temperature on the final brightness of pulp treated in the process of the invention.

Employing conditions analogous to those of Example 1, samples of northern pine groundwood, initial brightness 64.2% GE, are treated at varying temperatures for three hours with chromium II—EDTA complex. The final brightness values obtained are shown in FIG. 5.

EXAMPLE 5

Figure 6:
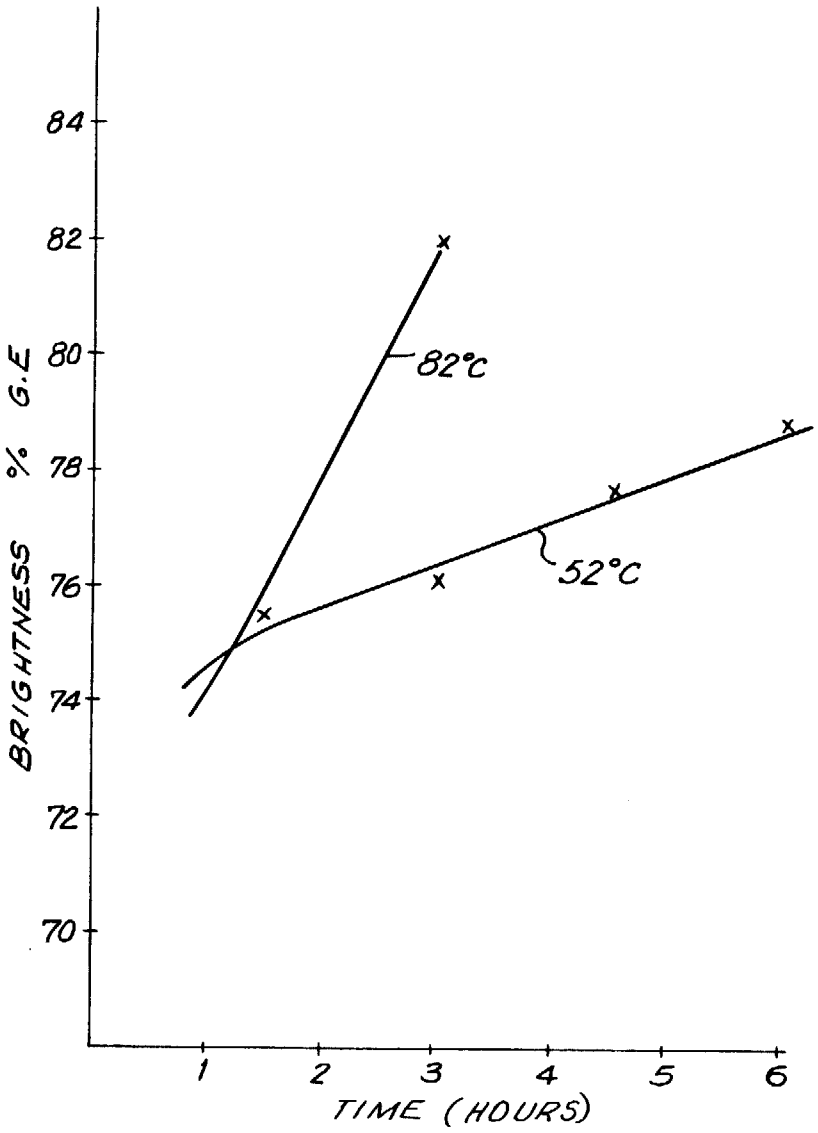
FIG. 6 is an illustration of the dependency on reaction time of the brightness of pulp treated in the process of the invention at 52° C. and 82° C.

Employing conditions analogous to those of Example 1, sample of northern pine groundwood, initial brightness 64.2% GE, are treated at 82° C. (curve with greater slope) or 52° C. (curve with lesser slope) with chromium II—EDTA complex for varying periods of time. The final brightness values found are shown in FIG. 6.

Figure 7:
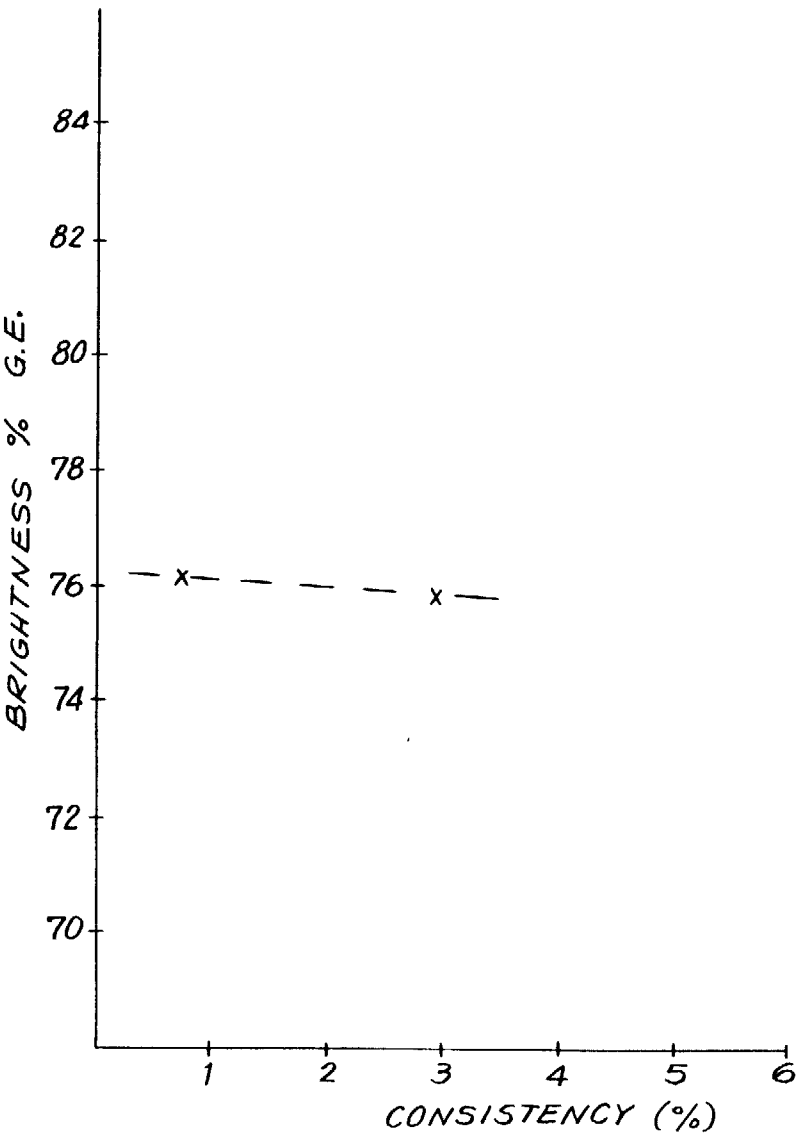
FIG. 7 is an illustration of the relationship between pulp consistency in the reaction and pulp brightness obtained from the process of the invention.

EXAMPLE 6 employing conditions analogous to those of Example 1, samples of northern pine groundwood, initial brightness 64.2% GE, are treated at 52° C. at varying consistencies with chromium II—EDTA complex. The final brightness values found are shown in FIG. 7.

EXAMPLE 7

Figure 8:
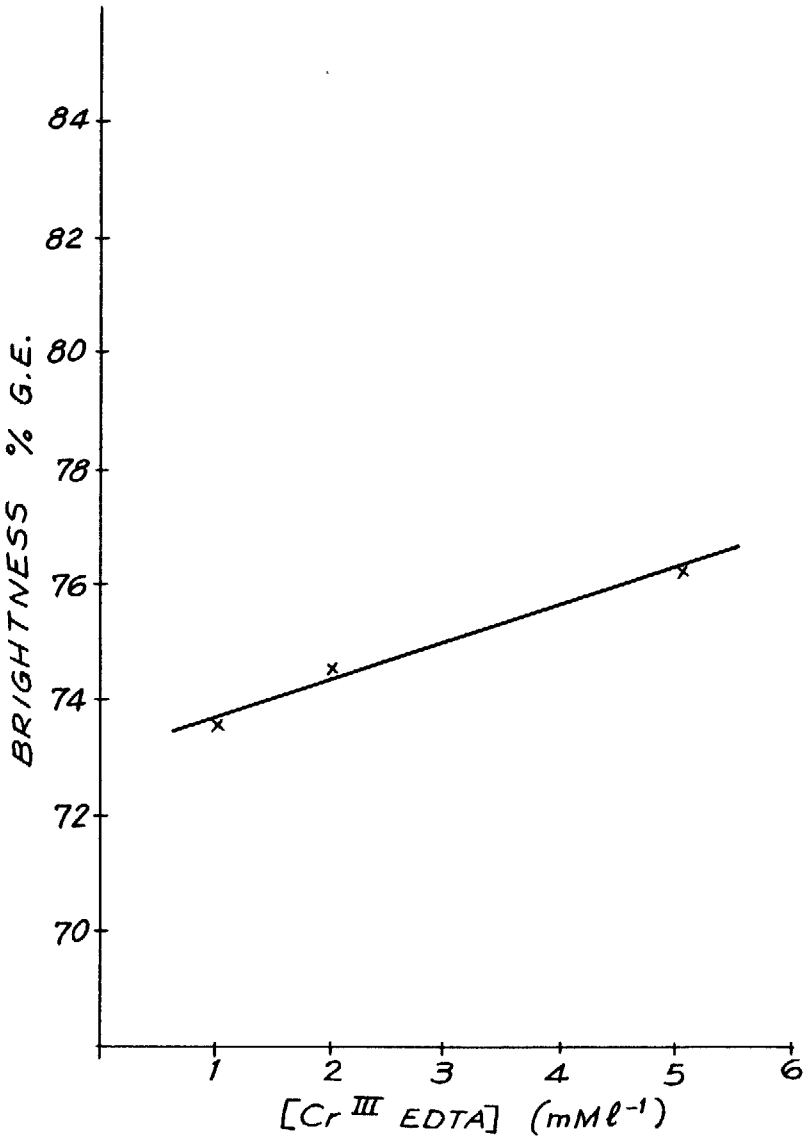
FIG. 8 is an illustration of the relationship between the concentration of chromium-ethylenediamine-tetraacetic acid (EDTA) complex in the reaction and pulp brightness obtained in the process of the invention.

Employing conditions analogous to those of Example 1, samples of northern pine groundwood, initial brightness, 64.2% GE, are treated at 52° C. with varying concentrations of chromium II—EDTA complex, conveniently measured by varying the initial concentration of chromium III—EDTA complex initially introduced into the reaction. The final brightness values found are shown in FIG. 8.

The subject matter which applicants regard as their invention is particularly pointed out and distinctly claimed as follows:

We claim:

1. [A continuous] *An* electrochemical reductive process for increasing the brightness of lignocellulosic pulp which comprises reacting said lignocellulosic pulp with a polydentate ligand complex of $Cr^{++}$ or $V^{++}$ formed by the electrochemical reduction of the complexed trivalent chromium or vanadium metal ion having a concentration from about 0.1 millimole to the upper limit of solubility of the complex wherein the lignocellulosic pulp is brightened during the reaction.

2. A process is defined in claim 1 wherein the lignocellulosic pulp is mechanical wood pulp.

3. A process as defined in claim 1 wherein the lignocellulosic pulp is chemical wood pulp.

4. A process as defined claim 1 wherein the polydentate ligand complex is of $Cr^{++}$.

5. A process as defined in claim 1 wherein the polydentate ligand complex is of $V^{++}$.

6. A process as defined in claim 1 wherein the polydentate ligand is an aminopolycarboxylic acid.

7. A process as defined in claim 6 wherein the aminopolycarboxylic acid is ethylenediamine tetraacetic acid.

8. A process as defined in claim 6 wherein the aminopolycarboxylic acid is 1, 2-diaminocyclohexanetetraacetic acid.

9. A process as defined in claim 6 wherein the aminopolycarboxylic acid is diethylenetriaminopentaacetic acid.

10. A process as defined in claim 1 wherein the polydentate ligand is 8-hydroxyquinoline or a substituted 8-hydroxyquinoline.

11. A process as defined in claim 10 wherein the substituted 8-hydroxyquinoline is 8-hydroxyquinoline-5-sulfonic acid.

* * * * *